United States Patent
Li et al.

(10) Patent No.: US 12,312,372 B2
(45) Date of Patent: *May 27, 2025

(54) PREPARATION METHOD OF GLUFOSINATE OR DERIVATIVES THEREOF

(71) Applicant: LIER CHEMICAL CO., LTD., Sichuan (CN)

(72) Inventors: Yuedong Li, Sichuan (CN); Yongjiang Liu, Sichuan (CN); Yuting Qin, Sichuan (CN); Xiang Zuo, Sichuan (CN); Ke Cheng, Sichuan (CN); Xiaoliang Zeng, Sichuan (CN); Yingsui Yin, Sichuan (CN)

(73) Assignee: LIER CHEMICAL CO., LTD., Mianyang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,119

(22) Filed: Mar. 6, 2024

(65) Prior Publication Data

US 2024/0217996 A1 Jul. 4, 2024

Related U.S. Application Data

(63) Continuation of application No. PCT/CN2023/083701, filed on Mar. 24, 2023.

(30) Foreign Application Priority Data

Dec. 2, 2022 (CN) .......................... 202211545734.9

(51) Int. Cl.
C07F 9/38 (2006.01)

(52) U.S. Cl.
CPC .................. C07F 9/3895 (2013.01)

(58) Field of Classification Search
CPC .......... C07F 9/3895; C07F 9/30; C07F 9/301; C07F 9/572; C07F 9/6506
See application file for complete search history.

(56) References Cited

U.S. PATENT DOCUMENTS

| | | | | |
|---|---|---|---|---|
| 11,680,077 B2* | 6/2023 | Liu | .......................... | C07F 9/301 562/11 |
| 11,932,662 B2* | 3/2024 | Liu | .......................... | C07F 9/52 |
| 2022/0259232 A1* | 8/2022 | Liu | .......................... | C07F 9/301 |
| 2023/0331750 A1* | 10/2023 | Liu | .......................... | C07F 9/301 |
| 2024/0270683 A1* | 8/2024 | Mudaliar | .............. | C07C 271/22 |

FOREIGN PATENT DOCUMENTS

| | | |
|---|---|---|
| AU | 2022314007 | 6/2023 |
| AU | 2022316399 | 6/2023 |
| CN | 106083922 | 11/2016 |
| CN | 108727427 | 11/2018 |
| CN | 109232644 | 1/2019 |
| CN | 115246857 | 10/2022 |
| CN | 116041387 | 5/2023 |
| EP | 4371992 | 5/2024 |
| JP | S59502025 | 12/1984 |
| SU | 165724 | 10/1964 |
| TW | 202224561 | 7/2022 |
| TW | 202310746 | 3/2023 |
| TW | 202313645 | 4/2023 |
| WO | 2021143712 | 7/2021 |
| WO | 2021143713 | 7/2021 |
| WO | 2021147894 | 7/2021 |
| WO | 2022264168 | 12/2022 |
| WO | 2023001131 | 1/2023 |
| WO | 2023001185 | 1/2023 |

OTHER PUBLICATIONS

Written Opinion of the Int'l Searching Authority for Int'l Appl. No. PCT/CN2023/083701, mailed Jun. 24, 2023, 3 pages.
Kuzhikalail MA, Van Wazer JR. Redistribution, condensation, and rearrangement reactions involving dichloro- and dimethoxymethylphosphines. Inorganic Chemistry. Oct. 1, 1974;13(10):2346-50.
Xu, X. S., et al. "A Facile Synthetic Route to L-Phosphinothricin." Chinese Chemical Letters, 2006, vol. 17, No. 2, pp. 177-179.
Bayer, E. et al., Stoffwechselprodukt von Milroorganosen, Helvetica Chimica Acta, 1972, vol. 55, No. 1, pp. 224-239.
Weissermel, K. et al., Advances in Organophosphorus Chemistry Based on Dichloro(methyl)phosphane, Angewandte Chemie International Edition, 1981, vol. 20, No. 3, pp. 223-233, doi:10.1002/anie.198102231.
Samuels, M.C., Heutz, F.J.L., Grabulosa, A. et al. Solid-Phase Synthesis and Catalytic Screening of Polystyrene Supported Diphosphines. Top Catal 59, 1793-1799 (2016).

* cited by examiner

*Primary Examiner* — Joseph K McKane
*Assistant Examiner* — David M Shim
(74) *Attorney, Agent, or Firm* — Robin L. Teskin; Baker, Donelson, Bearman, Caldwell & Berkowitz PC

(57) ABSTRACT

The present disclosure relates to the preparation method of glufosinate or derivatives thereof.

37 Claims, No Drawings

PREPARATION METHOD OF GLUFOSINATE OR DERIVATIVES THEREOF

CROSS-REFERENCE TO RELATED APPLICATIONS

This application is a continuation application of Int'l Chinese Appl. No. PCT/CN2023/083701, filed Mar. 24, 2023, which claims priority to Int'l Chinese Appl. No. 202211545734.9 filed Dec. 2, 2022, each and all of which are incorporated herein by reference in their entireties.

FIELD OF THE INVENTION

The present disclosure relates to the preparation method of glufosinate or derivatives thereof.

BACKGROUND OF THE INVENTION

Glufosinate is a highly potent, broad-spectrum, low toxicity, non-selective (sterilant) organophosphorus herbicide with certain systemic action developed by Hoechst in the 1980s. It can control annual or perennial dicotyledon weeds and gramineae weeds. Glufosinate has two (L- and D-) enantiomers. The herbicidal activity of L-glufosinate is twice as potent as that of racemic DL-glufosinate.

Existing methods for preparing glufosinate have many defects (such as complex processes, unsuitable for large-scale production, usage of highly toxic and/or expensive reagents, etc.).

SUMMARY OF THE INVENTION

The present disclosure provides a method for preparing glufosinate or derivatives thereof. The starting materials employed in the method are readily available, and the process procedures are suitable for industrial scale production.

In some embodiments, the present disclosure provides a method for preparing glufosinate of formula (I) or a salt, an enantiomer thereof or a mixture of the enantiomers in all ratios, characterized in that the method comprises the following steps:

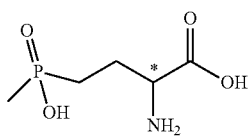
(I)

a) reacting a compound of formula (II) or a salt, an enantiomer thereof or a mixture of the enantiomers in all ratios with a compound of formula (III);

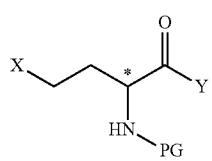
(II)

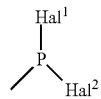
(III)

b) reacting the intermediate, no matter whether it is isolated or not, in the presence of water and an acid or a base to obtain the glufosinate (I) or a salt, an enantiomer thereof or a mixture of the enantiomers in all ratios:

when PG is an amino protecting group, a step of removing the amino protecting group can be further comprised:

wherein:

X is halogen, —OAc, —OTs, —OMs or

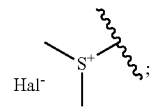

Hal, $Hal^1$ and $Hal^2$ are each independently halogen, e.g., fluorine, chlorine, bromine or iodine:

Y is —$OR_1$, —$NH_2$, —$NHR_2$ or —$N(R_2)(R_3)$:

PG is hydrogen or an amino protecting group, and the amino protecting group preferably is —C(=O)$R_4$, —C(=O)O$R_4$ or —S(=O)$_2R_4$:

$R_1$, $R_2$ and $R_3$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl, 3-10-membered heterocyclyl or —Si($R_5$)($R_6$)($R_7$):

$R_4$ is selected from the group consisting of $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl:

$R_5$, $R_6$ and $R_7$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl or 3-10-membered heterocyclyl:

the above alkyl, alkenyl, alkynyl, cycloalkyl, aryl, aralkyl, heteroaryl and heterocyclyl are each optionally substituted by one or more substituents independently selected from the group consisting of: halogen, —OH, =O, —O—($C_1$-$C_6$ alkyl), —C(=O)—($C_1$-$C_6$ alkyl), —C(=O)OH, —C(=O)O—($C_1$-$C_6$ alkyl), —$NH_2$, —$NO_2$, —CN, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl:

the chiral carbon atom is labeled with *.

In some embodiments, the present disclosure provides a method for preparing a compound of formula (I)-1 or a salt, an enantiomer thereof or a mixture of the enantiomers in all ratios, characterized in that the method comprises the following steps:

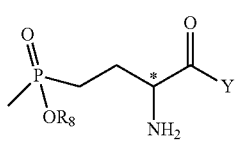
(I)-1 a) reacting a compound of formula (II) or a salt, an enantiomer thereof or a mixture of the enantiomers in all ratios with a compound of formula (III);

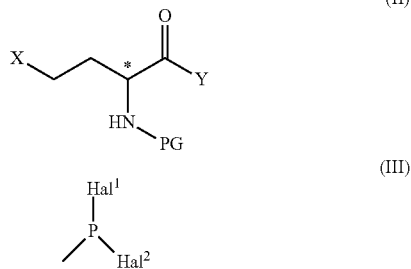

(II)

(III)

b-1) reacting the intermediate, no matter whether it is isolated or not, in the presence of $R_8OH$ (i.e., in the absence of an acid or a base), to obtain the compound of formula (I)-1 or a salt, an enantiomer thereof or a mixture of the enantiomers in all ratios;
when PG is an amino protecting group, a step of removing the amino protecting group can be further comprised;
wherein:
X is halogen, —OAc, —OTs, —OMs or

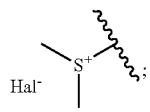

Hal, $Hal^1$ and $Hal^2$ are each independently halogen, e.g., fluorine, chlorine, bromine or iodine;
Y is —$OR_1$, —$NH_2$, —$NHR_2$ or —$N(R_2)(R_3)$;
PG is hydrogen or an amino protecting group, and the amino protecting group preferably is —C(=O)$R_4$, —C(=O)O$R_4$ or —S(=O)$_2R_4$;
$R_1$, $R_2$ and $R_3$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl, 3-10-membered heterocyclyl or —Si($R_5$)($R_6$)($R_7$);
$R_4$ is selected from the group consisting of $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl;
$R_5$, $R_6$ and $R_7$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl or 3-10-membered heterocyclyl;
$R_8$ is H, $C_1$-$C_6$ alkyl, $C_{3-10}$ cycloalkyl, $C_{6-10}$ aryl, $C_{6-12}$ aralkyl, 5-14-membered heteroaryl or 3-10-membered heterocyclyl: preferably, $R_8$ is H or $C_1$-$C_6$ alkyl: more preferably, $R_8$ is H, methyl or ethyl;
the above alkyl, alkenyl, alkynyl, cycloalkyl, aryl, aralkyl, heteroaryl and heterocyclyl are each optionally substituted by one or more substituents independently selected from the group consisting of: halogen, —OH, =O, —O—($C_1$-$C_6$ alkyl), —C(=O)—($C_1$-$C_6$ alkyl), —C(=O)OH, —C(=O)O—($C_1$-$C_6$ alkyl), —$NH_2$, —$NO_2$, —CN, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl;
the chiral carbon atom is labeled with *.

In some embodiments, the compound of formula (II) in the above step a) is enantiomerically pure, and the resulting glufosinate of formula (I) or a salt thereof, or the compound of formula (I)-1 or a salt thereof is also enantiomerically pure.

In some embodiments, the enantiomeric ratio of glufosinate of formula (I) or a salt thereof or the compound of formula (I)-1 or a salt thereof obtained by the above method is (L):(D)-enantiomer or (D):(L)-enantiomer of 50.5:49.5 to 99.5:0.5.

In some embodiments, in the above method, the molar ratio of the compound of formula (II) to the compound of formula (III) is ≥2:1.

In some embodiments, in the above method, the molar ratio of the compound of formula (II) to the compound of formula (III) is 0.2:1 to 10:1, preferably 0.7:1 to 5:1.

In some embodiments, the compound of formula (III) or a solution thereof is added to the compound of formula (II) or a solution thereof; or the compound of formula (II) or a solution thereof is added to the compound of formula (III) or a solution thereof.

In some embodiments, the compound of formula (III) or a solution thereof is added to the compound of formula (II) or a solution thereof in portions or in one portion: or the compound of formula (II) or a solution thereof is added to the compound of formula (III) or a solution thereof in portions or in one portion.

In some embodiments, X is chlorine, bromine, iodine, —OAc, —OTs, —OMs or

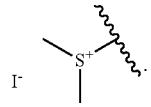

In some embodiments, X is chlorine.

In some embodiments, $R_1$, $R_2$ and $R_5$ are each independently hydrogen, $C_1$-$C_6$ alkyl, $C_{6-10}$ aryl or $C_{6-12}$ aralkyl.

In some embodiments, $R_1$, $R_2$ and $R_3$ are each independently $C_1$-$C_6$ alkyl, $C_{6-10}$ aryl or $C_6$-12 aralkyl.

In some embodiments, $R_1$, $R_2$ and $R_3$ are each independently methyl, ethyl, n-propyl, isopropyl, n-butyl, isobutyl, tert-butyl, pentyl, hexyl, phenyl, benzyl, phenylethyl, phenylpropyl, methylphenyl, ethylphenyl, propylphenyl or naphthyl: and more preferably ethyl.

In some embodiments, Y is —$NHCH_2CH_2CH_2CH_3$, —$N(CH_3)_2$, —$OCH_3$, —$OCH_2CH_3$, —$OCH_2CH_2CH_3$, —$OCH(CH_3)_2$, —$OCH_2CH_2CH_2CH_3$, —$OCH_2CH(CH_3)_2$ or —OBn.

In some embodiments, the Y is —$OR_1$.

In some embodiments, $R_1$ is ethyl or n-butyl.

In some embodiments, the PG is hydrogen, —C(=O) $CH_3$, —C(=O)Ph, —C(=O)O$C_2H_5$, —C(=O)OC($CH_3$)$_3$ or

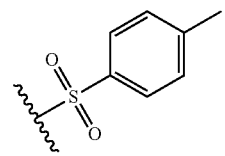

In some embodiments, PG is hydrogen.

In some embodiments, the compound of formula (III) is dichloro(methyl)phosphane.

In some embodiments, the compound of formula (III) is the only phosphorus-containing reaction starting material.

In some embodiments, in the step a), the reaction temperature is −50~200° C., preferably is −20~140° C. or 20~100° C.

In some embodiments, the step a) is carried out in the presence of a base, and the base is an inorganic base or an organic base:
  preferably, the molar ratio of (the compound of formula (II)+the above base) to the compound of formula (III) is ≥2.5:1, more preferably ≥3:1, and most preferably ≥4:1;
  the inorganic base is preferably ammonia, alkali metal oxide, alkaline earth metal oxide, alkali metal carbonate, alkaline earth metal carbonate, alkali metal bicarbonate or alkaline earth metal bicarbonate: e.g., potassium bicarbonate, sodium bicarbonate, lithium carbonate, potassium carbonate, sodium carbonate, cesium carbonate, calcium carbonate, magnesium carbonate, calcium oxide and magnesium oxide;
  the organic base is preferably an organic base containing no active hydrogen, and the base containing no active hydrogen is preferably triethylamine, N,N-dimethylaniline or pyridine, and the triethylamine, N,N-dimethylaniline and pyridine optionally have 1-3 substituents attached to one or more carbon atoms of the tertiary amine, and the substituents are selected from halogen, —OH, —O—($C_1$-$C_6$ alkyl), —$NH_2$, —$NO_2$, —CN, $C_1$-$C_6$ alkyl, $C_{3-10}$ cycloalkyl and $C_{6-10}$ aryl.

In some embodiments, when the step a) is carried out in the presence of a base containing active hydrogen (such as ammonia), the base containing active hydrogen is added after the compound of formula (II) is mixed with all or part of the compound of formula (III).

In some embodiments, when the step a) is carried out in the absence of an additional base, the molar ratio of the compound of formula (II) to the compound of formula (III) is preferably ≥4:1.

In some embodiments, the step a) is carried out under a solvent-free condition or in an inert solvent:
  preferably, the inert solvent is selected from any one or more of benzene solvents, amide solvents, hydrocarbon solvents, halogenated hydrocarbon solvents, sulfone or sulfoxide solvents, ether solvents or ester solvents:
  preferably, the inert solvent is selected from any one or more of benzene solvents, amide solvents, halogenated hydrocarbon solvents, ether solvents or ester solvents;
  more preferably, the inert solvent is selected from any one or more of chlorobenzene, xylene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

In some embodiments, in the step b), an inorganic acid or an organic acid is added.

In some embodiments, the inorganic acid is hydrochloric acid or sulfuric acid.

In some embodiments, in the step b), the base is an inorganic base or an organic base; preferably, the base is alkali metal hydroxide, alkaline earth metal hydroxide, alkali metal carbonate, alkaline earth metal carbonate, alkali metal bicarbonate or alkaline earth metal bicarbonate: more preferably, the base is NaOH, KOH or Ba(OH)$_2$.

In some embodiments, in the step b), the reaction temperature is 20~150° C.

In some embodiments, in the step b1), the reaction temperature is 0° C. to 100° C., preferably 0° C. to 80° C., more preferably 20° C. to 60° C. or 30° C. to 60° C.

The method of the present invention is particularly suitable for the preparation of glufosinate, substantially reduces the steps of the existing preparation processes, and has excellent reaction yield. The compound of formula (III) employed in the method of the present disclosure is readily available with low cost, which makes the method of the present disclosure suitable for industrial large-scale production.

In addition, in the preparation of L-glufosinate, the product can effectively maintain the ee value of the starting material. For example, when an enantiomerically pure starting material (e.g., the enantiomeric excess percentage (% ee) is greater than 90%) is employed, the enantiomeric excess percentage (% ee) of the prepared L-glufosinate is greater than e.g., 50%, 55%, 60%, 65%, 70%, 75%, 80%, 85%, 90% or 95%.

Definitions

Unless otherwise defined, all technical and scientific terms used herein are intended to have the same meaning as commonly understood by a person skilled in the art. References to techniques employed herein are intended to refer to the techniques as commonly understood in the art, including variations on those techniques or substitutions of equivalent techniques which would be apparent to a person skilled in the art. While it is believed that the following terms will be readily understood by a person skilled in the art, the following definitions are nevertheless put forth to better illustrate the present invention.

As used herein, the terms "contain", "include", "comprise", "have", or "relate to", as well as other variations used herein are inclusive or open-ended, and do not exclude additional, unrecited and do not exclude additional, unrecited elements or method steps.

The term "amino protecting group" refers to a group that can be attached to a nitrogen atom in an amino group to protect the amino group from participating the reaction and can be easily removed in the subsequent reactions. Suitable amino protecting groups include, but are not limited to, the following protecting groups:
  carbamate group of formula —C(=O)O—Ra, wherein Ra is e.g., methyl, ethyl, tert-butyl, benzyl, phenethyl, $CH_2$=CH—$CH_2$—, etc.; amide group of formula —C(=O)—Rb, wherein Rb is e.g., methyl, ethyl, phenyl, trifluoromethyl, etc.; N-sulfonyl derivative group of formula —S(=O)$_2$—$R^c$, wherein $R^c$ is e.g., tolyl, phenyl, trifluoromethyl, 2,2,5,7,8-pentamethylchroman-6-yl-, 2,3,6-trimethyl-4-methoxybenzene, etc.

The term "alkyl" refers to a saturated aliphatic hydrocarbon group, including linear and branched groups having 1 to 18 carbon atoms. Alkyl having 1 to 6 carbon atoms (i.e., $C_1$-$C_6$ alkyl), such as methyl, ethyl, propyl, 2-propyl, n-butyl, isobutyl, tert-butyl and pentyl, is preferred. The alkyl can be substituted or unsubstituted, and when substituted, the substituent can be halogen, nitro, sulfonyl, ether oxy, ether thio, ester, thioester or cyano.

The $C_1$-$C_4$ alkyl is linear or branched, comprising saturated hydrocarbon chain having 1 to 4 carbon atoms. It can be methyl, ethyl, propyl, isopropyl, butyl, isobutyl, sec-butyl or tert-butyl.

As used herein, the term "alkenyl" refers to a linear or branched monovalent hydrocarbyl containing one or more double bonds and having 2 to 6 carbon atoms ("$C_{2-6}$ alkenyl"). The alkenyl is, for example, vinyl, 1-propenyl, 2-propenyl, 2-butenyl, 3-butenyl, 2-pentenyl, 3-pentenyl, 4-pentenyl, 2-hexenyl, 3-hexenyl, 4-hexenyl, 5-hexenyl, 2-methyl-2-propenyl and 4-methyl-3-pentenyl. When the compound of the present invention contains an alkenyl group, the compound may exist as the pure E (entgegen) form, the pure Z (zusammen) form, or any mixture thereof.

As used herein, the term "alkynyl" represents a monovalent hydrocarbyl containing one or more triple bonds and preferably having 2, 3, 4, 5 or 6 carbon atoms, for example, an ethynyl or propynyl.

As used herein, the term "cycloalkyl" refers to a saturated monocyclic or polycyclic (e.g., bicyclic) hydrocarbon ring (e.g., monocyclic, such as cyclopropyl, cyclobutyl, cyclopentyl, cyclohexyl, cycloheptyl, cyclooctyl, cyclononyl, or bicyclic, including spiro, fused or bridged cyclic system (such as bicyclo[1.1.1]pentyl, bicyclo[2.2.1]heptyl, bicyclo[3.2.1]octyl or bicyclo[5.2.0]nonyl, decahydronaphthalene, etc.)), which is optionally substituted with one or more (e.g., 1 to 3) suitable substituents. The cycloalkyl has 3 to 15 carbon atoms. For example, the term "$C_{3-10}$ cycloalkyl" refers to a saturated monocyclic or polycyclic (e.g., bicyclic) hydrocarbon ring having 3 to 10 ring forming carbon atoms (e.g., cyclopropyl, cyclobutyl, cyclopentyl, or cyclohexyl), which is optionally substituted with one or more (e.g., 1 to 3) suitable substituents, e.g., methyl substituted cyclopropyl.

As used herein, the term "heterocyclyl" refers to a saturated or unsaturated, monovalent, monocyclic or bicyclic residue having 2, 3, 4, 5, 6, 7, 8 or 9 carbon atoms and one or more (e.g., 1, 2, 3 or 4) heteroatom-containing groups selected from the group consisting of C(=O), O, S, S(=O), S(=O)$_2$, and NR$^d$ wherein R$^d$ represents a hydrogen atom, $C_{1-6}$ alkyl, or $C_{1-6}$ haloalkyl group, in the ring. A heterocyclyl may be linked to the rest of a molecule through any one of the carbon atoms or a nitrogen atom (if present). In particular, 3- to 10-membered heterocyclyl refers to a group having 3 to 10 carbon atoms and heteroatom(s) in the ring, such as, but are not limited to, oxiranyl, aziridinyl, azetidinyl, oxetanyl, tetrahydrofuranyl, dioxolinyl, pyrrolidinyl, pyrrolidinonyl, imidazolidinyl, pyrazolidinyl, pyrrolinyl, tetrahydropyranyl, piperidinyl, morpholinyl, dithianyl, thiomorpholinyl, piperazinyl or trithianyl.

As used herein, the term "aryl" refers to an all-carbon monocyclic or fused-ring polycyclic aromatic group having a conjugated π electron system. For example, as used herein, the term "$C_{6-10}$ aryl" refers to an aromatic group containing 6 to 10 carbon atoms, such as phenyl or naphthyl. Aryl is optionally substituted with one or more (such as 1 to 3) suitable substituents (e.g., halogen, —OH, —CN, —NO$_2$, $C_{1-6}$ alkyl).

As used herein, the term "aralkyl" preferably means aryl substituted alkyl, wherein aryl and alkyl are as defined herein. Normally, the aryl group may have 6-10 carbon atoms, and the alkyl group may have 1-6 carbon atoms. Exemplary aralkyl group includes, but is not limited to, benzyl, phenylethyl, phenylpropyl, phenylbutyl.

As used herein, the term "heteroaryl" refers to a monovalent monocyclic, bicyclic or tricyclic aromatic ring system having 5, 6, 8, 9, 10, 11, 12, 13 or 14 ring atoms, particularly 1 or 2 or 3 or 4 or 5 or 6 or 9 or 10 carbon atoms, and containing at least one heteroatom (such as O, N, or S), which can be same or different. Moreover, in each case, it can be benzo-fused. In particular, heteroaryl is selected from the group consisting of thienyl, furyl, pyrrolyl, oxazolyl, thiazolyl, imidazolyl, pyrazolyl, isoxazolyl, isothiazolyl, oxadiazolyl, triazolyl, thiadiazolyl etc., and benzo derivatives thereof: or pyridinyl, pyridazinyl, pyrimidinyl, pyrazinyl, triazinyl, etc., and benzo derivatives thereof.

As used herein, the term "substituted" means that one or more (e.g., one, two, three, or four) hydrogens on a designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

As used herein, the term "base containing no active hydrogen" refers to a base comprising no groups such as NH, OH, SH and PH, etc. in the molecule.

As used herein, the "mixture of the enantiomers in all ratios" has the same meaning as the "mixture of the enantiomers in any ratio".

DETAILED DESCRIPTION OF THE INVENTION

Example 1

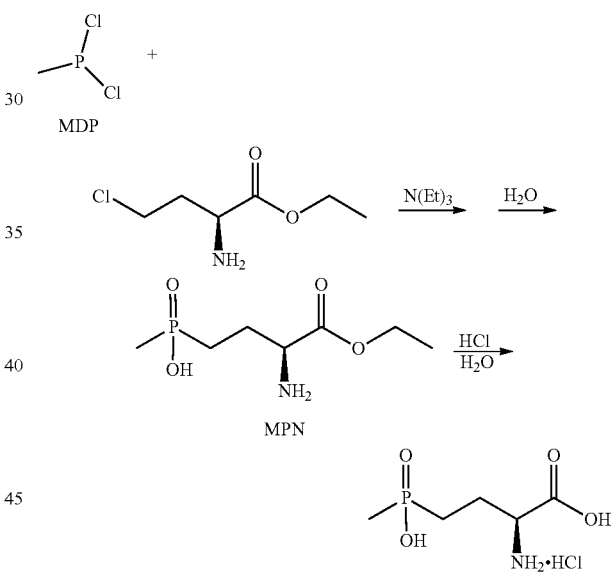

A solution of chlorohomoserine ethyl ester (2.1 eq, 162 g, 0.987 mol, ee value 99%) in chlorobenzene (835 g) and triethylamine (2.1 eq, 100 g, 0.987 mol) were added to a 1 L four-necked flask, nitrogen replacement was carried out after the addition, and the temperature was reduced to 0° C. in an ice water bath. A solution of MDP (1 eq, 55 g, 0.47 mol) in chlorobenzene (127.4 g) was added to a constant pressure dropping funnel, and the dropping was started while controlling the temperature at 0-5° C. and completed in 1.5 hours.

The resulting reaction solution was heated to 90° C. in an oil bath and reacted for 2 hours. After the reaction was completed, it was naturally cooled to 30° C. and filtrated, and the filter cake was washed with chlorobenzene (200 g).

The filtrate was added with water (300 g), stirred at 50° C. for 1 hour, and then 25% ammonia water (40 g) was added to adjust the pH to 7. Phases was separated after the neutralization, and water (100 g) was added to the lower organic phase for secondary extraction. The aqueous phases were combined, concentrated under reduced pressure to a viscous state, 500 g hydrochloric acid was added thereto, and heated to 100° C. for hydrolysis for 8 hours. A sample was taken to determine the absolute content and ee value of glufosinate acid in the reaction solution. Based on the theoretical yield of glufosinate acid (85.1 g) calculated from the amount of MDP, the yield of glufosinate acid was 92.6%, and the ee value was 98%.

Example 2

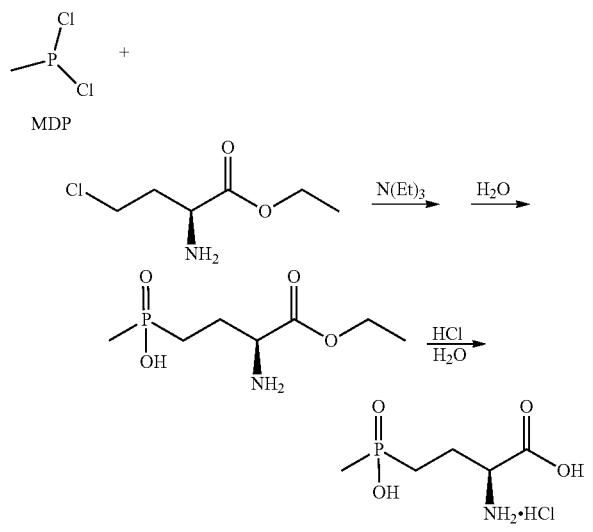

A solution of chlorohomoserine ethyl ester (concentration 30% w/w, 2.1 eq, 0.46 mol, ee: 99%) in chlorobenzene (255 g) and 46.7 g triethylamine (2.1 eq) were added to a 1 L four-necked flask, and cooled to 0° C. in an ice water bath. Nitrogen replacement was performed for three times. A solution of MDP (concentration 43.17% w/w, 1 eq, 0.22 mol) in chlorobenzene (60.5 g) was added to a constant pressure dropping funnel, and MDP was added dropwise under the protection of nitrogen, while keeping the temperature at 0-5° C. during the dropwise addition over about 1.5 h. After the dropwise addition was completed, the reaction was warmed in stages: firstly warmed to 60° C. and reacted for 1 h, then warmed to 80° C. and reacted for 0.5 h, and then naturally cooled to 20-30° C. The mixture was filtered with suction, the filter cake was washed with 110 g chlorobenzene, and the filtrate was left for the next reaction.

The above filtrate was added to a 1 L four-necked flask, added with 160 g water, warmed to 50° C., and mechanically stirred for 1 h. Then, 20 g ammonia water (concentration 25% w/w, 1.33 eq, 0.29 mol) was added at 50° C. to adjust the pH to 7-8, the mixture was stirred for 5 min, and the phases were separated after neutralization. The product was in the aqueous phase. The lower organic phase was extracted with water (60 g×2). The aqueous phases were combined, and the chlorohomoserine ethyl ester in the aqueous phase was back-extracted with 100 g chlorobenzene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 250 g hydrochloric acid (concentration 30% w/w, 9.3 eq, 2.1 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 92.6%, and the ee value was 98%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (1.1 eq) was 95% and the ee value was 96%.

Example 3

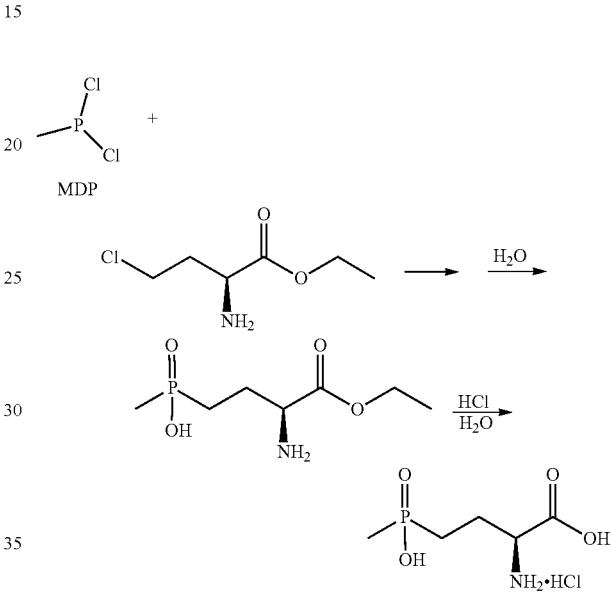

A solution of chlorohomoserine ethyl ester (concentration 40% w/w, 4.1 eq, 0.91 mol, ee: 96.3%) in chlorobenzene (375 g) was added to a 1 L four-necked flask, and cooled to 0° C. in an ice water bath. Nitrogen replacement was performed for three times. A solution of MDP (concentration 43.17% w/w, 1 eq, 0.22 mol) in chlorobenzene (60.5 g) was added to a constant pressure dropping funnel, and MDP was added dropwise under the protection of nitrogen, while keeping the temperature at 0-5° C. during the dropwise addition over about 1.5 h. After the dropwise addition was completed, the reaction was warmed in stages: firstly warmed to 60° C. and reacted for 1 h, then warmed to 80° C. and reacted for 0.5 h, and then naturally cooled.

The internal temperature was lowered to 60° C., 160 g water was added, the temperature was adjusted to 50° C., and the reaction was mechanically stirred for 1 h. 50 g ammonia water (concentration 25% w/w, 3.3 eq, 0.74 mol) was added at 50° C. to adjust the pH to 7-8, the mixture was stirred for 5 min, and the phases were separated after neutralization. The product was in the aqueous phase. The lower organic phase was extracted with water (60 g×2). The aqueous phases were combined, and the chlorohomoserine ethyl ester in the aqueous phase was back-extracted with 100 g chlorobenzene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 250 g hydrochloric acid (concentration 30% w/w, 9.3 eq, 2.1 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 92.8%, and the ee value was 93.8%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (3.1 eq) was 98% and the ee value was 94%.

Example 4

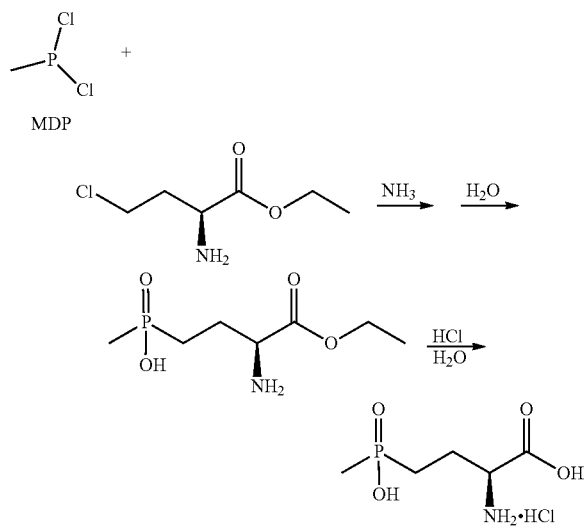

A solution of chlorohomoserine ethyl ester (concentration 40% w/w, 2.75 eq, 0.91 mol, ee: 96.3%) in chlorobenzene (375 g) was added to a 1 L four-necked flask, and cooled to 0° C. in an ice water bath. Nitrogen replacement was performed for three times. A solution of MDP (concentration: 49% w/w, 2/3 eq, 0.22 mol) in chlorobenzene (53 g) was added to a constant pressure dropping funnel, and MDP was added dropwise under the protection of nitrogen, while keeping the temperature at 0-5° C. during the dropwise addition over about 1.5 h. After the dropwise addition was completed, the mixture was stirred for 30 min, ammonia gas was pumped in at a rate of 200 mL/min for 45 min, which was stopped until gas overflowed, and the total amount of ammonia gas was 7.5 g (1.33 eq, 0.44 mol). Then the temperature was warmed to 15-20° C., ammonia was removed under vacuum of −0.095 MPa for 30 min, and nitrogen was pumped in. The reaction was cooled to 0-10° C., and a further solution of MDP (concentration 49% w/w, 1/3 eq, 0.11 mol) in chlorobenzene (13.2 g) was dropwise added. After the dropwise addition was completed, the reaction was warmed in stages: firstly warmed to 60° C. and reacted for 1 h, then warmed to 80° C. and reacted for 0.5 h, and then naturally cooled.

The internal temperature was lowered to 60° C., 200 g water was added, the internal temperature was adjusted to 50° C., and the reaction was mechanically stirred for 1 h. 50 g ammonia water (concentration 25% w/w, 2.3 eq, 0.75 mol) was added at 50° C. to adjust the pH to 7-8, the mixture was stirred for 5 min, and the phases were separated after neutralization. The product was in the aqueous phase. The lower organic phase was extracted with water (60 g×2). The aqueous phases were combined, and the chlorohomoserine ethyl ester in the aqueous phase was back-extracted with 100 g chlorobenzene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 373 g hydrochloric acid (concentration 30% w/w, 9.3 eq, 3.07 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 90.77%, and the ee value was 92.3%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (1.75 eq) was 95.2% and the ee value was 93.5%.

Example 5

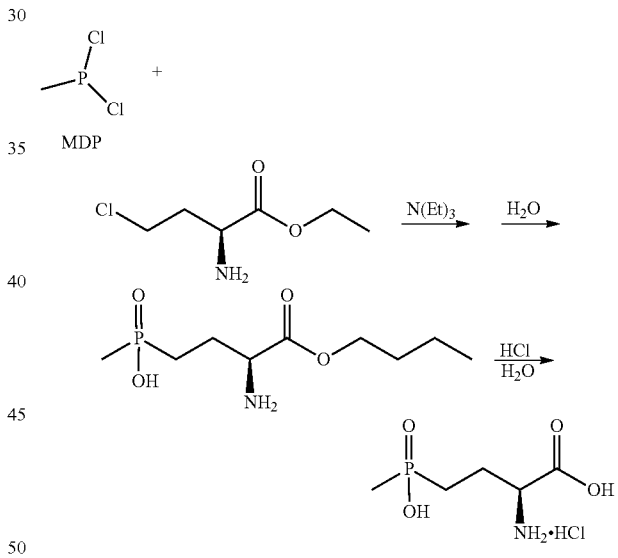

A solution of chlorohomoserine ethyl ester (concentration 41.5% w/w, 2.1 eq, 0.35 mol, ee: 99%) in xylene (163.4 g) and 35.4 g triethylamine (2.1 eq) were added to a 1 L four-necked flask, and cooled to 0° C. in an ice water bath. Nitrogen replacement was performed for three times. A solution of MDP (concentration 50% w/w, 1 eq, 0.165 mol) in xylene (38.7 g) was added to a constant pressure dropping funnel, and MDP was added dropwise under the protection of nitrogen, while keeping the temperature at 0-5° C. during the dropwise addition over about 1.5 h. After the dropwise addition was completed, the reaction was warmed in stages: firstly warmed to 60° C. and reacted for 1 h, then warmed to 80° C. and reacted for 0.5 h, and then naturally cooled to 20-30° C. The mixture was filtered with suction, the filter cake was washed with 150 g xylene, and the filtrate was left for the next reaction.

The above filtrate was added to a 1 L four-necked flask, added with 180 g water, warmed to 50° C., and mechanically stirred for 1 h. 20 g ammonia water (concentration 25% w/w, 1.78 eq, 0.29 mol) was added at 50° C. to adjust the pH to 7-8, the mixture was stirred for 5 min, and the phases were separated after neutralization. The product was in the aqueous phase. The upper organic phase was extracted with water (60 g×2). The aqueous phases were combined, and the chlorohomoserine ethyl ester in the aqueous phase was back-extracted with 100 g xylene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 255 g hydrochloric acid (concentration 30% w/w, 12.7 eq, 2.1 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 87.5%, and the ee value was 97.10%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (1.1 eq) was 95% and the ee value was 98.25%.

Example 6

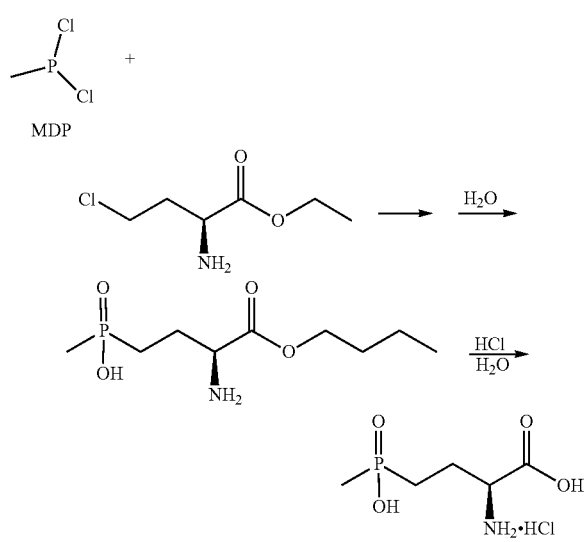

A solution of chlorohomoserine ethyl ester (concentration 38.54% w/w, 4.1 eq, 0.935 mol, ee: 99.6%) in xylene (470.5 g) was added to a 1 L four-necked flask, and cooled to 0-5° C. in an ice water bath. Nitrogen replacement was performed for three times. A solution of MDP (concentration 50% w/w, 1 eq, 0.228 mol) in xylene (53.35 g) was added to a constant pressure dropping funnel, and MDP was added dropwise under the protection of nitrogen, while keeping the temperature at 0-5° C. during the dropwise addition over about 1.5 h. After the dropwise addition was completed, the reaction was warmed to 80° C. and reacted for 2 h, and then naturally cooled.

The internal temperature was lowered to 70° C., 160 g water was added, the temperature was adjusted to 70° C., and the reaction was mechanically stirred for 1 h. 50 g ammonia water (concentration 25% w/w, 3.2 eq, 0.74 mol) was added at 25-30° C. to adjust the pH to 7-8, the mixture was stirred for 5 min, and the phases were separated after neutralization. The product was in the aqueous phase. The upper organic phase was extracted with water (60 g×2). The aqueous phases were combined, and the chlorohomoserine ethyl ester in the aqueous phase was back-extracted with 100 g xylene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 250 g hydrochloric acid (concentration 30% w/w, 9.2 eq, 2.1 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 88%, and the ee value was 97.29%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (3.1 eq) was 95.73% and the ee value was 95.68%.

Example 7

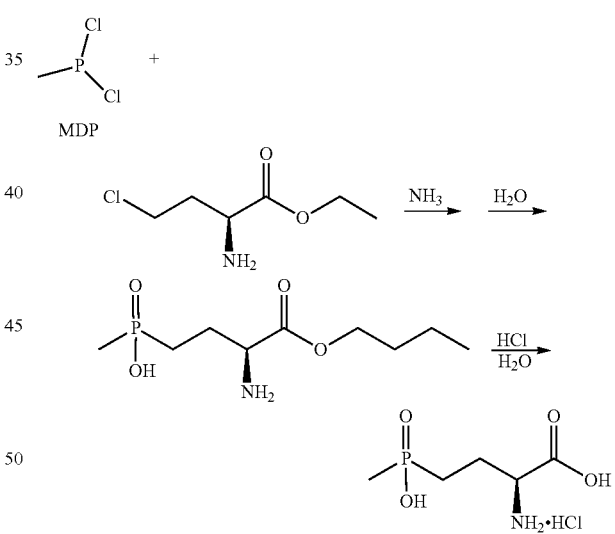

A solution of chlorohomoserine ethyl ester (concentration 38.54% w/w, 2.75 eq, 0.69 mol, ee: 99.6%) in xylene (370.9 g) was added to a 1 L four-necked flask, and cooled to 0° C. in an ice water bath. Nitrogen replacement was performed for three times. A solution of MDP (concentration 50% w/w, 2/3 eq) in xylene (39.2 g) was added to a constant pressure dropping funnel, and MDP was added dropwise under the protection of nitrogen, while keeping the temperature at 0-5° C. during the dropwise addition over about 1.5 h. After the dropwise addition was completed, the mixture was stirred for 10-30 min, ammonia gas was pumped in at a rate of 200 mL/min for 30 min, which was stopped until gas overflowed, and the total amount of ammonia gas was 5.7 g (1.33 eq, 0.33 mol). Then the temperature was warmed to 15-20° C., ammonia was removed under vacuum of −0.095 MPa for 20-30 min, and nitrogen was pumped in. The reaction was cooled to 0-10° C., and a further solution of MDP (concentration 50% w/w, 1/3 eq) in xylene (19.5 g) was dropwise added. The reaction was warmed to 80° C. and reacted for 0.5 h, and then naturally cooled.

The internal temperature was lowered to 70° C., 180 g water was added, the internal temperature was adjusted to 70° C., and the reaction was mechanically stirred for 1 h. 50 g ammonia water (concentration 25% w/w, 2.96 eq, 0.74 mol) was added at 25-30° C. to adjust the pH to 7-8, the mixture was stirred for 5 min, and the phases were separated after neutralization. The product was in the aqueous phase. The upper organic phase was extracted with water (60 g×2). The aqueous phases were combined, and the chlorohomoserine ethyl ester in the aqueous phase was back-extracted with 100 g xylene. The final aqueous phase was subject to the next hydrolysis, and the organic phase was kept for the recovery of the starting material of chlorohomoserine ethyl ester.

The above final aqueous phase was distilled under reduced pressure to remove most of the water, concentrated to a viscous state, 250 g hydrochloric acid (concentration 30% w/w, 8.4 eq, 2.1 mol) was added thereto, and heated to 100° C. for hydrolysis for 8 hours. A sample was taken to determine the absolute content (by LC) and ee value of glufosinate acid. Based on the theoretical yield of glufosinate acid calculated from the amount of MDP, the yield of glufosinate acid was 85.2%, and the ee value was 97.61%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (1.75 eq) was 95.68% and the ee value was 96.15%.

Example 8

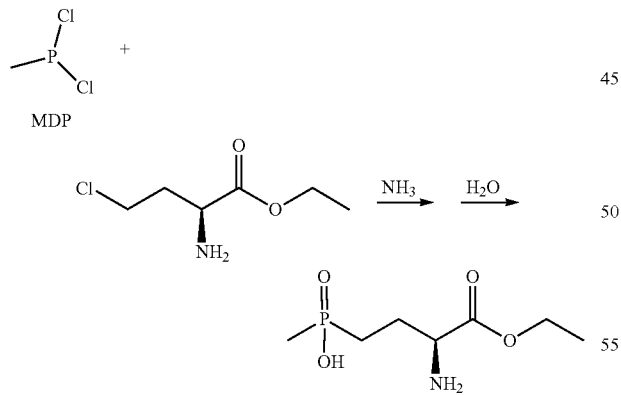

A solution of chlorohomoserine ethyl ester (concentration 40% w/w, 2.75 eq, 0.91 mol, ee: 96.3%) in chlorobenzene (375 g) was added to a 1 L four-necked flask, and cooled to 0° C. in an ice water bath. Nitrogen replacement was performed for three times. A solution of MDP (concentration: 49% w/w, 2/3 eq, 0.22 mol) in chlorobenzene (53 g) was added to a constant pressure dropping funnel, and MDP was added dropwise under the protection of nitrogen, while keeping the temperature at 0-5° C. during the dropwise addition over about 1.5 h. After the dropwise addition was completed, the mixture was stirred for 30 min, ammonia gas was pumped in at a rate of 200 mL/min for 45 min, which was stopped until gas overflowed, and the total amount of ammonia gas was 7.5 g (1.33 eq, 0.44 mol). Then the temperature was warmed to 15-20° C., ammonia was removed under vacuum of −0.095 MPa for 30 min, and nitrogen was pumped in. The reaction was cooled to 0-10° C., and a further solution of MDP (concentration 49% w/w, 1/3 eq, 0.11 mol) in chlorobenzene (13.2 g) was dropwise added. After the dropwise addition was completed, the reaction was warmed in stages: firstly warmed to 60° C. and reacted for 1 h, then warmed to 80° C. and reacted for 0.5 h, and then naturally cooled.

The internal temperature was lowered to 60° C., 200 g water was added, the internal temperature was adjusted to 50° C., and the reaction was mechanically stirred for 1 h. 50 g ammonia water (concentration 25% w/w, 2.3 eq, 0.75 mol) was added at 50° C. to adjust the pH to 7-8, the mixture was stirred for 5 min, and the phases were separated after neutralization. The product was in the aqueous phase. The lower organic phase was extracted with water (60 g×2). The aqueous phases were combined, and the chlorohomoserine ethyl ester in the aqueous phase was back-extracted with 100 g chlorobenzene. The organic phase was kept for the recovery of the starting material of chlorohomoserine ethyl ester.

A sample was taken to determine the absolute content (by LC) of MPN. Based on the theoretical yield of MPN calculated from the amount of MDP, the yield of MPN was 77.5%.

A sample was taken to determine the absolute content (by LC) and ee value of chlorohomoserine ethyl ester in the above-mentioned organic phase. Upon calculation, it was determined that the recovery rate of the excess chlorohomoserine ethyl ester (1.75 eq) was 97.8% and the ee value was 95.3%.

In addition to those described herein, according to the foregoing description, various modifications to the present invention would be apparent to those skilled in the art. Such modifications are intended to fall within the scope of the appended claims. Each reference cited herein (including all patents, patent applications, journal articles, books and any other disclosures) are incorporated herein by reference in its entirety.

What is claimed is:

1. A method for preparing glufosinate of formula (I) or a compound of formula (I)-1, or a salt, an enantiomer thereof or a mixture of the enantiomers in all ratios, wherein the method comprises the following steps:

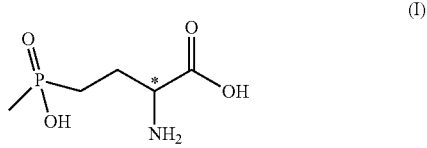

(I)

or

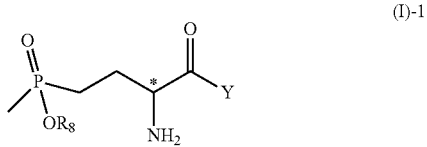

(I)-1 a) reacting a compound of formula (II) or a salt, an enantiomer thereof or a mixture of the enantiomers in all ratios with a compound of formula (III), wherein the compound of formula (III) is the only phosphorus-containing reaction starting material;

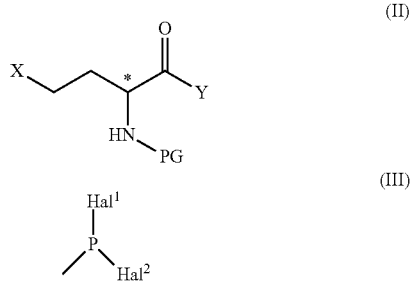

when the method is for preparing glufosinate of formula (I), the method further comprises step b) reacting the intermediate, no matter whether it is isolated or not, in the presence of water and an acid or a base to obtain the glufosinate (1) or a salt, an enantiomer thereof or a mixture of the enantiomers in all ratios;

when the method is for preparing a compound of formula (I)-1, the method further comprises step b-1) reacting the intermediate, no matter whether it is isolated or not, in the presence of $R_8OH$, to obtain the compound of formula (I)-1 or a salt, an enantiomer thereof or a mixture of the enantiomers in all ratios;

when PG is an amino protecting group, a step of removing the amino protecting group can be further comprised;

wherein:

X is halogen, —OAc, —OTs, —OMs or

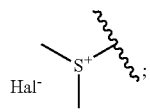

Hal, $Hal^1$ and $Hal^2$ are each independently halogen selected from fluorine, chlorine, bromine or iodine;

Y is —$OR_1$, —$NH_2$, —$NHR_2$ or —$N(R_2)(R_3)$;

PG is hydrogen or an amino protecting group selected from —C(=O)$R_4$, —C(=O)$OR_4$ or —S(=O)$_2R_4$;

$R_1$, $R_2$ and $R_3$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl, 3-10-membered heterocyclyl or —Si($R_5$)($R_6$)($R_7$);

$R_4$ is selected from the group consisting of $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl;

$R_5$, $R_6$ and $R_7$ are each independently hydrogen, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl or 3-10-membered heterocyclyl;

$R_8$ is H, $C_1$-$C_6$ alkyl, $C_{3-10}$ cycloalkyl, $C_{6-10}$ aryl, $C_{6-12}$ aralkyl, 5-14-membered heteroaryl or 3-10-membered heterocyclyl;

the above alkyl, alkenyl, alkynyl, cycloalkyl, aryl, aralkyl, heteroaryl and heterocyclyl are each optionally substituted by one or more substituents independently selected from the group consisting of: halogen, —OH, =O, —O—($C_1$-$C_6$ alkyl), —C(=O)—($C_1$-$C_6$ alkyl), —C(=O)OH, —C(=O)O—($C_1$-$C_6$ alkyl), —$NH_2$, —$NO_2$, —CN, $C_1$-$C_6$ alkyl, $C_2$-$C_6$ alkenyl, $C_2$-$C_6$ alkynyl, $C_{3-10}$ cycloalkyl, $C_{6-10}$ aryl, $C_{6-12}$ aralkyl, 5-14-membered heteroaryl and 3-10-membered heterocyclyl;

the chiral carbon atom is labeled with *.

2. The method according to claim 1, wherein the compound of formula (II) in step a) is enantiomerically pure, and the resulting glufosinate of formula (I) or a salt thereof or the compound of formula (I)-1 or a salt thereof is also enantiomerically pure.

3. The method according to claim 1, wherein the enantiomeric ratio of glufosinate of formula (I) or a salt thereof or the compound of formula (I)-1 or a salt thereof is (L):(D)-enantiomer or (D):(L)-enantiomer of 50.5:49.5 to 99.5:0.5.

4. The method according to claim 1, wherein the molar ratio of the compound of formula (II) to the compound of formula (III) is >2:1.

5. The method according to claim 1, wherein the compound of formula (III) or a solution thereof is added to the compound of formula (II) or a solution thereof; or the compound of formula (II) or a solution thereof is added to the compound of formula (III) or a solution thereof.

6. The method according to claim 1, wherein X is chlorine, bromine, iodine, —OAc, —OTs, —OMs or

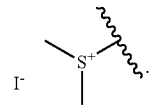

7. The method according to claim 1, wherein $R_1$, $R_2$ and $R_3$ are each independently hydrogen, $C_1$-$C_6$ alkyl, $C_{6-10}$ aryl or $C_{6-12}$ aralkyl.

8. The method according to claim 1, wherein Y is —$NHCH_2CH_2CH_2CH_3$, —$N(CH_3)_2$, —$OCH_3$, —$OCH_2CH_3$, —$OCH_2CH_2CH_3$, —$OCH(CH_3)_2$, —$OCH_2CH_2CH_2CH_3$, —$OCH_2CH(CH_3)_2$ or —OBn.

9. The method according to claim 1, wherein the Y is —$OR_1$.

10. The method according to claim 1 wherein the PG is hydrogen, —C(=O)$CH_3$, —C(=O)Ph, —C(=O)$OC_2H_5$, —C(=O)OC($CH_3$)$_3$ or

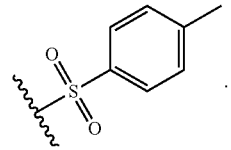 [SMILES: *S(=O)(=O)c1ccc(C)cc1]

11. The method according to claim 1, wherein the compound of formula (III) is dichloro(methyl)phosphane.

12. The method according to claim 1, wherein in the step a), the reaction temperature is −50~200° C.

13. The method according to claim 1, wherein the step a) is carried out in the presence of a base, and the base is an inorganic base or an organic base.

14. The method according to claim 1, wherein when the step a) is carried out in the absence of an additional base.

15. The method according to claim 1, wherein the step a) is carried out under a solvent-free condition or in an inert solvent.

16. The method according to claim 1, wherein in the step b), an inorganic acid or an organic acid is added.

17. The method according to claim 16, wherein the inorganic acid is hydrochloric acid or sulfuric acid.

18. The method according to claim 1, wherein in the step b), the base is an inorganic base or an organic base.

19. The method according to claim 18, wherein the base is alkali metal hydroxide, alkaline earth metal hydroxide, alkali metal carbonate, alkaline earth metal carbonate, alkali metal bicarbonate or alkaline earth metal bicarbonate.

20. The method according to claim 19, wherein the base is NaOH, KOH or Ba(OH)$_2$.

21. The method according to claim 1, wherein in the step b), the reaction temperature is 20~150° C.

22. The method according to claim 1, wherein in the step b-1), the reaction temperature is 0° C. to 100° C.

23. The method according to claim 1, wherein $R_8$ is H, methyl or ethyl.

24. The method according to claim 5, wherein the compound of formula (III) or a solution thereof is added to the compound of formula (II) or a solution thereof in portions or in one portion; or the compound of formula (II) or a solution thereof is added to the compound of formula (III) or a solution thereof in portions or in one portion.

25. The method according to claim 7, wherein $R_1$, $R_2$ and $R_3$ are each independently methyl, ethyl, n-propyl, isopropyl, n-butyl, isobutyl, tert-butyl, pentyl, hexyl, phenyl, benzyl, phenylethyl, phenylpropyl, methylphenyl, ethylphenyl, propylphenyl or naphthyl.

26. The method according to claim 9, wherein $R_1$ is ethyl or n-butyl.

27. The method according to claim 12, wherein in the step a), the reaction temperature is −20~140° C. or 20~100° C.

28. The method according to claim 13, wherein the molar ratio of (the compound of formula (II)+the base) to the compound of formula (III) is ≥2.5:1.

29. The method according to claim 28, wherein the molar ratio of (the compound of formula (II)+the base) to the compound of formula (III) is ≥3:1.

30. The method according to claim 29, wherein the molar ratio of (the compound of formula (II)+the base) to the compound of formula (III) is 4:1.

31. The method according to claim 13, wherein the inorganic base is ammonia, alkali metal oxide, alkaline earth metal oxide, alkali metal carbonate, alkaline earth metal carbonate, alkali metal bicarbonate or alkaline earth metal bicarbonate;

the organic base is an organic base containing no active hydrogen.

32. The method according to claim 31, wherein the inorganic base is potassium bicarbonate, sodium bicarbonate, lithium carbonate, potassium carbonate, sodium carbonate, cesium carbonate, calcium carbonate, magnesium carbonate, calcium oxide and magnesium oxide;

the organic base is an organic base containing no active hydrogen, and the base containing no active hydrogen is triethylamine, N,N-dimethylaniline or pyridine, and the triethylamine, N,N-dimethylaniline and pyridine optionally have 1-3 substituents attached to one or more carbon atoms of the tertiary amine, and the substituents are selected from halogen, —OH, —O—($C_1$-$C_6$ alkyl), —NH$_2$, —NO$_2$, —CN, $C_1$-$C_6$ alkyl, $C_{3-10}$ cycloalkyl and $C_{6-10}$ aryl.

33. The method according to claim 14, wherein the molar ratio of the compound of formula (II) to the compound of formula (III) is ≥4:1.

34. The method according to claim 15, wherein the inert solvent is selected from any one or more of benzene solvents, amide solvents, hydrocarbon solvents, halogenated hydrocarbon solvents, sulfone or sulfoxide solvents, ether solvents or ester solvents.

35. The method according to claim 15, wherein the inert solvent is one or more selected from any one or more of chlorobenzene, xylene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

36. The method according to claim 22, wherein in the step b-1), the reaction temperature is 0° C. to 80° C.

37. The method according to claim 22, wherein in the step b-1), the reaction temperature is 20° C. to 60° C. or 30° C. to 60° C.

* * * * *